April 20, 1965   W. BINDER ETAL   3,179,858
CONTROLLABLE PERMANENT MAGNETIC CHUCK
Filed Aug. 3, 1962

United States Patent Office 3,179,858
Patented Apr. 20, 1965

3,179,858
CONTROLLABLE PERMANENT MAGNETIC CHUCK
Wilhelm Binder and Rudolf Hauer, Villingen, Germany, assignors to Binder Magnete K.G., Villingen, Black Forest, Germany
Filed Aug. 3, 1962, Ser. No. 214,684
Claims priority, application Germany, Aug. 8, 1961, B 63,576
3 Claims. (Cl. 317—159)

The present invention relates to a permanent magnetic chuck which can be rendered operative or inoperative at will.

Magnetic chucks of this general type are known. Thus, it is known, in such a holding plate, to provide a pole piece assembly which consists of soft iron bars arranged side by side with non-magnetic separator bars between them. The magnet system is located directly beneath this pole piece assembly. In one known example, the permanent magnets, which are arranged side by side, are magnetized in a direction at right angles to the gripping surface of the pole piece assembly. Between each pair of adjacent permanent magnets, there is located a soft iron bar. The permanent magnets and the soft iron bars are furthermore magnetically insulated from one another by narrow non-magnetic separator strips. On the under side of this arrangement is arranged a soft iron plate which is connected to the lower poles of the permanent magnets and to the lower ends of the soft iron bars. In order to effect a changeover from the operative condition to the inoperative condition of the fixing plate or vice versa, the pole piece assembly and the magnet system are displaced relatively to one another parallel to the magnetic gripping surface. In order to be able to short-circuit the magnetic flux, when the magnetic chuck is rendered inoperative, the soft iron bars of the pole piece assembly in this arrangement must be of approximately the same width as the permanent magnets.

This arrangement has the disadvantage that it is scarcely possible to magnetize the soft iron bars up to the point of saturation. In order to obviate this disadvantage, it is known to magnetize the permanent magnets in a direction parallel to the plane of the magnetic gripping surface and to arrange between the adjoining permanent magnets soft iron bars which concentrate the magnetic flux and conduct it to the soft iron bars of the pole piece assembly. By this means, the soft iron bars of the pole piece assembly can be kept relatively narrow so that a high induction is achieved. On the other hand, with this arrangement the non-magnetic separator bars which separate the adjoining soft iron bars of the pole piece assembly must be of substantially the same width as the permanent magnets, so that, to render the system inoperative, the soft iron bars of the pole piece assembly can be brought into the inoperative position in which they are located centrally above the permanent magnets. Consequently, the magnetic force available at the magnetic gripping surface is again only small, since the soft iron bars are spaced a relatively large distance apart. It is scarcely possible to grip parts of small dimensions reliably on such a plate.

It is an object of the present invention to combine the advantages of the two systems described above in a single permanent magnetic chuck, while at the same time avoiding the inherent disadvantages of these systems.

This object is achieved according to the present invention in that the cross section of the permanent magnets, in the direction of magnetization, is reduced from the base of the magnet system up to the pole piece assembly, while the cross section of the soft iron bars located between the magnets is correspondingly increased. With this arrangement, it is possible to subdivide the pole piece assembly so that the non-magnetic separator bars have a smaller width than the soft iron bars. The width of the separator bars can advantageously be chosen so that it is just sufficient to limit the leakage flux between adjacent soft iron bars to a permissible value. In this magnetic chuck, moreover, by far the greater part of the magnetic gripping surface is magnetically effective, so that even relatively small parts can be reliably gripped. On the other hand, it is possible, by using permanent magnets which are magnetized transversely and are of varying cross section and by suitably selecting the height of the magnetic system, to increase the magnetization of the soft iron bars of the pole piece assembly up to the point of saturation.

A constructional embodiment of the invention will now be described in greater detail with reference to the accompanying diagrammatic drawings, in which.

Figure 1A:
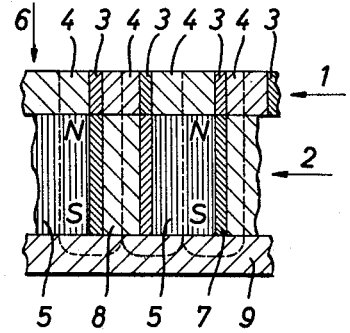
FIGS. 1a, 1b and FIGS. 2a, 2b are fragmentary cross sections of two different known magnetic chucks of the prior art.
Figure 1B:
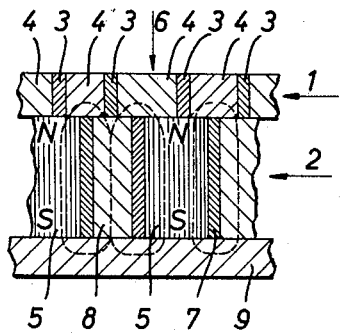

As has been explained above and as shown in FIGS. 1a and 1b, a magnetic chuck is known in which the pole piece assembly 1 consists of soft iron bars 4 with non-magnetic separator bars 3 between them. Directly beneath the pole piece assembly 1 is arranged a magnet system 2 which comprises permanent magnets 5 disposed at right angles to the magnetic gripping surface 6 and soft iron bars 8 arranged between the permanent magnets. The soft iron bars and the permanent magnets are separated from one another by non-magnetic separator bars 7. Beneath this magnetic system 2 is arranged a soft iron plate 9 which connects the soft iron bars 8 with the lower poles of the magnets. As is clear from FIG. 1a, the separator bars of the pole piece assembly and of the magnet system are of equal dimensions, while the widths of the soft iron bars 4 correspond respectively to the widths of the permanent magnets and the widths of the soft iron bars 8 disposed between them. FIG. 1a shows the system of the prior art in the operative condition, the direction of the magnetic flux being indicated in broken lines. In FIG. 1b the same system is shown in the inoperative condition, the pole piece assembly 1 and the magnet system 2 being displaced relatively to one another parallel to the magnetic gripping surface 6 so that the lines of force, which are indicated in broken lines, are short-circuited. When, however, the magnetic chuck is in the operative condition shown in FIG. 1a, the lines of force can only be short-circuited when a work-piece is placed on the magnetic gripping surface. In this arrangement, the width of the soft iron bars 4 is relatively great, so that magnetization up to the point of saturation is not possible.

Figure 2A:
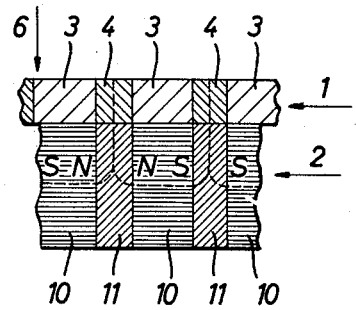
Figure 2B:
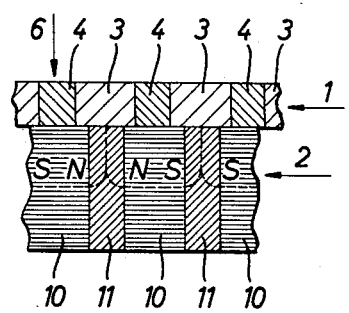

In the known arrangement according to FIGS. 2a and 2b, the pole piece assembly 1 is constructed similarly to that in the example shown in FIGS. 1a and 1b. The magnet system includes, however, in the transverse direction, permanent magnets 10 with soft iron strips 11 disposed between them. The soft iron strips concentrate the magnetic flux from the adjoining poles of the permanent magnets and conduct it to the superimposed soft iron bars 4 of the pole piece assembly. In this manner, it is possible to achieve a relatively high degree of magnetization of the soft iron bars 4. At the same time, however, relatively wide non-magnetic separator bars 3 have to be incorporated in the pole piece assembly in order to bring the soft iron bars 4 into the neutral zone of the permanent magnets, as shown in FIG. 2b, so as to render the magnetic chuck inoperative. Since the greater part of the magnetic gripping surface consists of non-magnetic material, the magnetic force permanently available in this surface is relatively small. The magnetic flux in the operative condition (FIG. 2a) and in the inoperative condition (FIG. 2b) is once again indicated in broken lines. It is clear that, in this constructional embodiment, the lines of force are not short-circuited when it is in the inoperative condition.

Figure 3A:
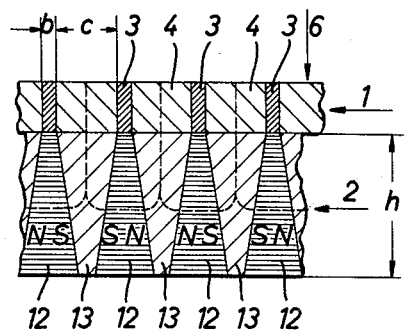
FIGS. 3a and 3b are fragmentary cross sections of a magnetic chuck according to the invention.
Figure 3B:
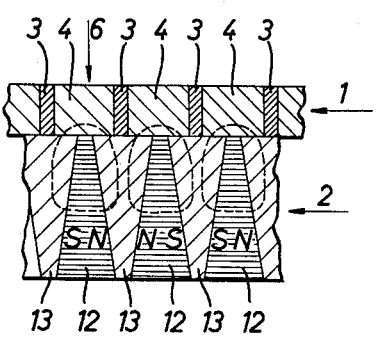

In order to avoid the disadvantages of the two magnetic chucks illustrated respectively in FIGS. 1a, 1b and FIGS. 2a, 2b, the magnetization of the permanent magnets in the arrangement according to the invention, as in the known arrangement according to FIG. 2a, is parallel to the gripping surface 6. However, whereas in the known arrangement, the cross section of the individual parts of the magnet system 2 is uniform, in the embodiment of the invention shown in FIGS. 3a and 3b the cross sections of the permanent magnets 12 taken in the direction of magnetization vary, so that there is a gradual reduction in cross section from the under side of the fixing plate up to the pole piece assembly. By this means, it is possible for the soft iron bars 4 of the pole piece assembly to be given a relatively large width c, while the width b of the non-magnetic separator bars 3 is reduced and does not exceed the magnitude necessary for concentrating the magnetic lines of force. With this arrangement, it is possible, by suitably selecting the height h of the magnetic system, to increase the induction in the soft iron bars 4 of the pole piece assembly up to the point of saturation. At the same time, by far the greater part of the gripping surface 6 is available for exerting magnetic attraction. Also, this arrangement has the advantage, as shown in FIG. 3b, that, in the inoperative condition, the lines of force form a completely closed circuit within the magnetic chuck, which is an important advantage from the point of view of insuring long life of the magnet system. The operations for rendering the magnetic chuck inoperative and operative are carried out in known manner by relative movement of the pole piece assembly and the magnet system. In each of FIGS. 3a and 3b, the path of the magnetic flux is once again indicated in broken lines.

The numeral 13 designates the soft iron pieces between the permanent magnets 12 in the magnet system. Numeral 15 (FIG. 4) designates the soft iron base plate, and numeral 16 is the vertical side plate between the pole piece assembly 1 and the base plate 15.

Figure 4:
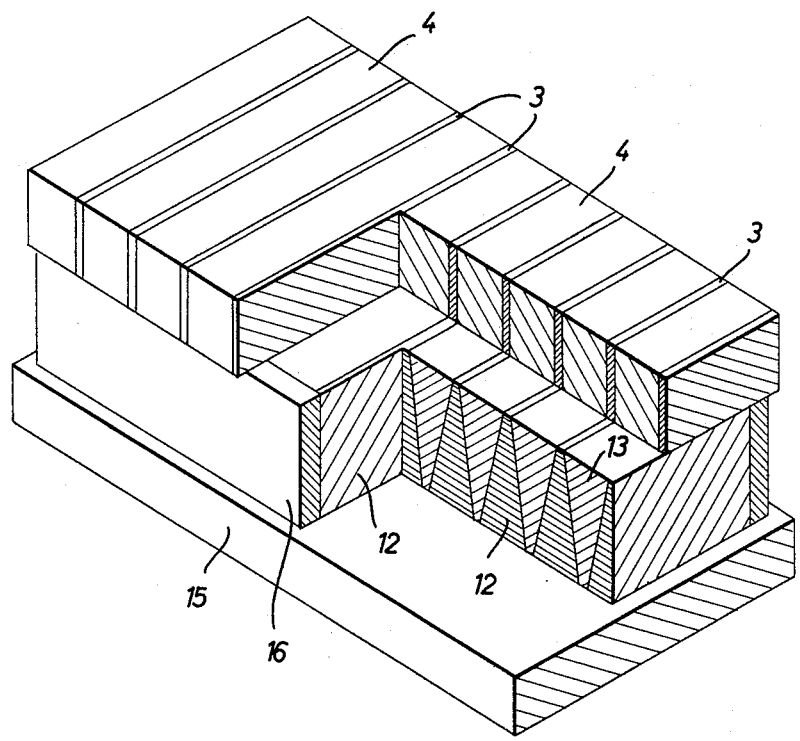
FIG. 4 is a perspective view, partly broken away, of a magnetic chuck according to the invention.

In FIG. 4, a complete magnetic chuck according to the invention is illustrated in perspective. Part of the chuck is cut away in order to show the construction of the plate. Since, however, this construction is similar to that shown in FIGS. 3a and 3b, there is no need for any further detailed description thereof.

It will be obvious to those skilled in the art, upon a study of this disclosure, that this invention permits of various modifications and alterations with respect to the individual components and arrangements disclosed, and hence can be embodied in equipment other than as particularly illustrated and described herein, without departing from the essential features of the invention and within the spirit and scope of the claims annexed hereto.

We claim:

1. A permanent-magnetic chuck capable of being rendered magnetically operative and inoperative, comprising a pole piece assembly having a magnetic gripping surface and provided with first soft iron bars mutually arranged side by side, and non-magnetic separator bars between said first iron bars, the widths of said separator bars being less than the widths of said first soft iron bars, a magnet system disposed beneath said pole piece assembly and comprising permanent magnets mutually arranged side by side and magnetized in a direction parallel to said magnetic gripping surface, other soft iron bars located in said magnet system between adjacent ones of said permanent magnets and defining with said first soft iron bars mutual contacting surfaces when said chuck is in operative condition, said pole piece assembly and said magnet system being displaceable relative to one another along and past said contacting surfaces into operative and inoperative condition in a direction parallel to the direction of magnetization of the permanent magnets, the respective first and other soft iron bars having equal cross sectional dimensions at their mutual contacting surfaces, the cross section of said permanent magnets in said direction of magnetization decreasing gradually from the base of the magnet system up to the pole piece assembly, and the cross section of said other soft iron bars correspondingly increasing.

2. Permanent-magnetic chuck according to claim 1, the width of said non-magnetic separator bars being at least the magnitude necessary for concentrating the magnetic lines of force in a closed circuit through said first and other soft iron bars when said chuck is in said inoperative condition.

3. A magnetic chuck according to claim 2, the height of said magnet system being so chosen in relation to said widths of said separator bars that, when said assembly and magnet system are in said operative condition, said other soft iron bars in the region adjacent said contact surfaces, and consequently also said first soft iron bars, are all magnetized up to their respective points of saturation of induction.

References Cited by the Examiner
UNITED STATES PATENTS 2,947,921 8/60 Watelet _____ 317—159
3,039,026 6/62 Levesque _____ 317—159

FOREIGN PATENTS 774,398 5/57 Great Britain.

JOHN F. BURNS, *Primary Examiner.*